US010947915B2

(12) United States Patent
Nakada et al.

(10) Patent No.: US 10,947,915 B2
(45) Date of Patent: Mar. 16, 2021

(54) CONTROL SYSTEM

(71) Applicant: TOYOTA JIDOSHA KABUSHIKI KAISHA, Toyota (JP)

(72) Inventors: Hayato Nakada, Minamitsuru-gun (JP); Takeshi Sano, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/451,539

(22) Filed: Jun. 25, 2019

(65) Prior Publication Data

US 2020/0032727 A1 Jan. 30, 2020

(30) Foreign Application Priority Data

Jul. 30, 2018 (JP) .............................. JP2018-142733

(51) Int. Cl.
*F02D 41/00* (2006.01)
*G05B 13/04* (2006.01)
*G06F 17/11* (2006.01)

(52) U.S. Cl.
CPC ..... *F02D 41/0052* (2013.01); *F02D 41/0062* (2013.01); *F02D 41/0065* (2013.01);
(Continued)

(58) Field of Classification Search
CPC ............. F02D 41/0052; F02D 41/0062; F02D 41/0065; F02D 2041/0067; F02D 2041/1419; F02D 2041/1412; F02D 2041/141; F02D 41/3836; F02D 41/1406; F02D 41/0047; F02D 41/0007; F02D 45/00; F02D 41/1401; F02D 23/02; F02D 41/0072; F02D 41/0235; F02D 2041/1433;
(Continued)

(56) References Cited

U.S. PATENT DOCUMENTS

2014/0111132 A1* 4/2014 Youm ..................... H02P 23/20
318/561
2014/0316683 A1* 10/2014 Whitney ............. F02D 41/0007
701/108
(Continued)

FOREIGN PATENT DOCUMENTS

JP 2015-169178 A 9/2015
JP 2016-169688 A 9/2016
(Continued)

*Primary Examiner* — Joseph J Dallo
(74) *Attorney, Agent, or Firm* — Oliff PLC

(57) ABSTRACT

A control system includes an electronic control unit including a feedback controller and a reference governor. The feedback controller is configured to determine a value of control input such that a value of control output approximates a target value. The reference governor is configured to calculate, with a prediction model, a predicted maximum value of an overshoot amount of the control output that overshoots from the target value. The prediction model is derived assuming that an n-th delay (n is a natural number) occurs in a response of the control output. The reference governor is configured to calculate the target value by correcting the provisional target value of the control output based on the predicted maximum value so as to increase a degree of satisfaction of a constraint condition with regard to the control output.

10 Claims, 7 Drawing Sheets

(52) U.S. Cl.
CPC ............ *G05B 13/048* (2013.01); *G06F 17/11* (2013.01); *F02D 2041/0067* (2013.01)

(58) Field of Classification Search
CPC .... G05B 13/048; G05B 13/04; G05B 13/042; G05B 11/01; G05B 17/00; G06F 17/11
See application file for complete search history.

(56) References Cited

U.S. PATENT DOCUMENTS

| | | | | |
|---|---|---|---|---|
| 2015/0039206 | A1* | 2/2015 | Storch | F02D 11/10 |
| | | | | 701/103 |
| 2015/0217766 | A1* | 8/2015 | Kelly | F16H 61/0213 |
| | | | | 701/94 |
| 2015/0275784 | A1* | 10/2015 | Whitney | F02D 17/02 |
| | | | | 701/102 |
| 2019/0285015 | A1* | 9/2019 | Sano | G06F 17/11 |

FOREIGN PATENT DOCUMENTS

| | | |
|---|---|---|
| JP | 2017-020357 A | 1/2017 |
| JP | 2017-101627 A | 6/2017 |
| JP | 2018-063586 A | 4/2018 |

\* cited by examiner

CONTROL SYSTEM

INCORPORATION BY REFERENCE

The disclosure of Japanese Patent Application No. 2018-142733 filed on Jul. 30, 2018 including the specification, drawings and abstract is incorporated herein by reference in its entirety.

BACKGROUND

1. Technical Field

The present disclosure relates to a control system including a reference governor.

2. Description of Related Art

There are known control devices that correct a target value of control output with a reference governor so as to increase the degree of satisfaction of a constraint condition (for example, Japanese Patent Application Publication No. 2017-020357 (JP 2017-020357 A), Japanese Patent Application Publication No. 2017-101627 (JP 2017-101627 A), and Japanese Patent Application Publication No. 2016-169688 (JP 2016-169688 A)). For example, in the reference governors disclosed in JP 2017-020357 A, JP 2017-101627 A, and JP 2016-169688 A, the target values of a supercharging pressure and an EGR rate are corrected so as to increase the degree of satisfaction of constraint conditions with regard to the supercharging pressure and the EGR rate of an internal combustion engine.

Among these reference governors, the reference governor disclosed in JP 2017-020357 A uses a prediction model to perform future prediction about a supercharging pressure and an EGR rate when target values of the supercharging pressure and the EGR rate are set as provisional target values. In addition, the reference governor corrects the provisional target values by using the predicted values of the supercharging pressure and the EGR rate so as to increase the degree of satisfaction of constraint conditions with regard to the supercharging pressure and the EGR rate. Through repetition of such operation, the reference governor repeatedly corrects the provisional target values to calculate final provisional target values, and set the final provisional target values as the target values of the supercharging pressure and the EGR rate.

SUMMARY

Now, in the case of performing future prediction about control output, such as a supercharging pressure and an EGR rate, it is conceived, for example, that a prediction model is derived in advance, assuming that a secondary delay occurs in a response to the control output, and the prediction model is used during vehicle operation to calculate a future prediction value of the control output. In such a prediction model, it is generally conceived that the future prediction value is calculated on the assumption that an initial value of a change rate of the control output is zero.

However, the control output, such as a supercharging pressure and an EGR rate, is often variable during operation of an internal combustion engine. Accordingly, when the future prediction value is calculated assuming the initial value of the change rate is zero, it is difficult to calculate the future prediction value of the control output with sufficient accuracy. When the future prediction value of the control output is calculated with a low accuracy, it may result in the situation where an optimal target value of the control output is not calculable.

The present disclosure relates to a control system that calculates a target value of control output using a reference governor, in which an optimal target value is calculated.

The present disclosure has been made in order to solve the above-stated problem as summarized below.

A first aspect of the present disclosure is a control system. The control system includes an electronic control unit including a feedback controller and a reference governor. The feedback controller is configured to determine a value of control input such that a value of control output approximates a target value. The reference governor is configured to calculate, with a prediction model, a predicted maximum value of an overshoot amount of the control output from the target value, based on a current value of the control output, a provisional target value of the control output, and a current change rate of the control output. The prediction model is derived assuming that an n-th delay (n is a natural number) occurs in a response of the control output. The reference governor is configured to calculate the target value by correcting the provisional target value of the control output based on the predicted maximum value so as to increase a degree of satisfaction of a constraint condition with regard to the control output.

In the control system, the prediction model may be derived assuming that a secondary delay occurs in the response of the control output.

In the control system, the reference governor may be configured to calculate the predicted maximum value by using, as the prediction model, expressions (1), (2) as follows:

$$OS_{max} = \mu(r(t) - x(t)) \quad (1)$$

$$\mu = \frac{e^{-\zeta\omega_n t_{os}}}{\sqrt{D^2 + E^2}}(E + CD) \quad (2)$$

where $OS_{max}$ may represent the predicted maximum value, $r(t)$ may represent the provisional target value of the control output, and $x(t)$ may represent the current value of the control output in the expression (1), $\zeta$ may represent a damping coefficient, $\omega_n$ may represent a natural angular frequency, and $t_{os}$ may represent a maximum time when the overshoot amount is predicted to be the maximum in expression (2), and C, D, E may be defined by expressions (3), (4), (5) as follows:

$$C = \frac{x'_0 - K\zeta\omega_n}{\omega_d} \quad (3)$$

$$D = x'_0 \quad (4)$$

$$E = \frac{K\omega_n - x'_0\zeta}{\sqrt{1-\zeta^2}} \quad (5)$$

$$\omega_d = \omega_n\sqrt{1-\zeta^2} \quad (6)$$

where K may represent gain, and $x'_0$ may represent the current change rate of the control output in expressions (3), (4), (5), and $\omega_d$ may be defined by subsequent expression (6).

In the control system, the maximum time $t_{os}$ may be calculated by expression (7) as follows:

$$t_{os} = \frac{\pi - \varphi}{\omega_d} \quad (7)$$

$$\varphi = \tan^{-1}\frac{x'_0\sqrt{1-\zeta^2}}{K\omega_n - x'_0\zeta} \quad (8)$$

where $t_{os}$ may represent the maximum time in the expression (7) and φ may be defined by subsequent expression (8).

In the control system, the reference governor may be configured to calculate the target value by correcting the provisional target value of the control output such that a value of an objective function becomes smaller. The value of the objective function may be determined in consideration of the degree of satisfaction of the constraint condition with regard to the control output. The value of the objective function may be calculated such that as the predicted maximum value calculated by the reference governor becomes larger beyond an upper limit, the degree of satisfaction of the constraint condition becomes lower and the value of the objective function becomes larger.

In the control system, a value of at least one parameter used in the prediction model may be changed depending on control gain in the feedback controller.

The control system may further include an internal combustion engine including a supercharger. The electronic control unit may control the internal combustion engine, and the control output may include supercharging pressure.

The control system may further include an internal combustion engine including an exhaust gas recirculation system that supplies some of exhaust gas to an intake passage. The electronic control unit may control the internal combustion engine, and the control output may include an exhaust gas recirculation rate.

The control system may further include an internal combustion engine including a particulate filter that catches fine particles in exhaust gas. The electronic control unit may control the internal combustion engine, and the control output may include temperature of the particulate filter.

The control system may further include an internal combustion engine including a fuel-pressure control device that controls pressure of fuel supplied to a fuel injection valve that injects the fuel into a combustion chamber. The electronic control unit may control the internal combustion engine, and the control output may include the pressure of the fuel.

The present disclosure relates to a control system that calculates a target value of control output using a reference governor, in which an optimal target value can be calculated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described in details with reference to the drawings. In the following description, like component members are designated by like reference numbers.

Figure 1:
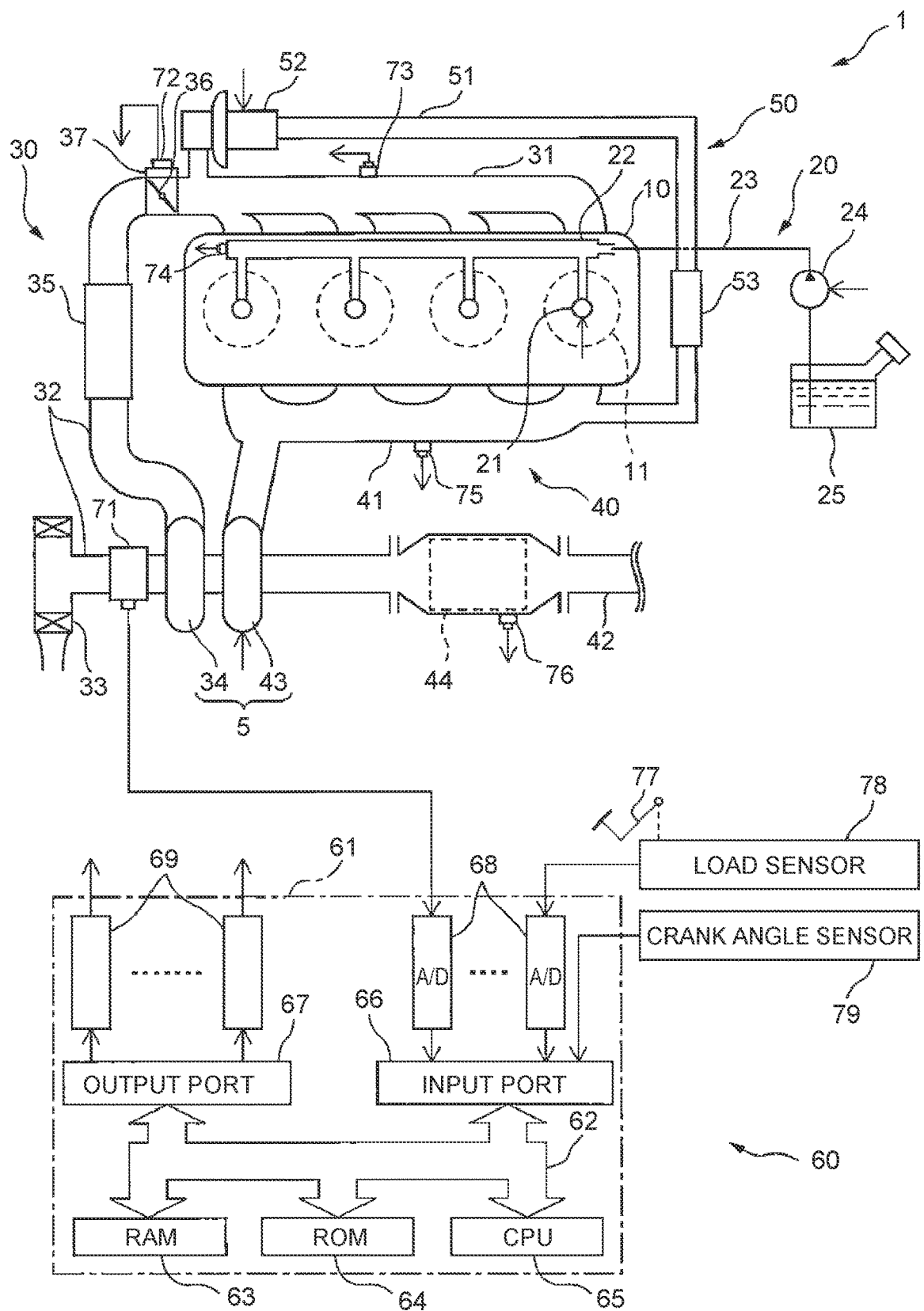
FIG. 1 is a schematic block diagram of an internal combustion engine that uses a control device according to one embodiment.

First, the configuration of an internal combustion engine 1 that uses a control device according to a first embodiment will be described with reference to FIG. 1. FIG. 1 is a schematic block diagram of the internal combustion engine 1. The internal combustion engine of the present embodiment is a compression self-ignition internal combustion engine that uses light oil as fuel. As shown in FIG. 1, the internal combustion engine 1 includes an engine body 10, a fuel supply device 20, an intake system 30, an exhaust system 40, an exhaust gas recirculation (EGR) system 50, and a control device 60.

The engine body 10 includes a cylinder block, a cylinder head, and a crank case. In the cylinder block, a plurality of cylinders 11 are formed. In the cylinder head, intake ports and exhaust ports are formed. In each of the cylinders 11, a piston is disposed. The cylinders 11 communicate with the intake ports and the exhaust ports, respectively.

The fuel supply device 20 includes fuel injection valves 21, a common rail 22, a fuel supply pipe 23, a fuel pump 24, and a fuel tank 25. The fuel injection valves 21 are disposed in the cylinder head so as to directly inject fuel into combustion chambers of the cylinders 11, respectively. The fuel injection valves 21 are coupled with the fuel tank 25 through the common rail 22 and the fuel supply pipe 23. In the fuel supply pipe 23, a fuel pump 24 is disposed to pump the fuel in the fuel tank 25. The fuel pumped by the fuel pump 24 is supplied to the common rail 22 through the fuel supply pipe 23, and is directly injected into the combustion chambers of the cylinders 11 from the fuel injection valves 21. The pressure of the fuel in the common rail 22 is regulated by changing the output of the fuel pump 24. Therefore, the fuel pump 24 functions as a fuel-pressure control device that controls the pressure of the fuel supplied to the fuel injection valves 21. The fuel injection valves 21 may be configured to inject fuel into the intake ports.

The intake system 30 includes an intake manifold 31, an intake pipe 32, an air cleaner 33, a compressor 34 of an exhaust-driven turbocharger 5, an intercooler 35, and a throttle valve 36. The intake ports of the cylinders 11 communicate with the air cleaner 33 through the intake manifold 31 and the intake pipe 32. In the intake pipe 32, a compressor 34 of the exhaust-driven turbocharger 5 is provided to compress and eject the intake air that circulates through the intake pipe 32, and an intercooler 35 is provided to cool the air compressed by the compressor 34. The throttle valve 36 can change an opening area of the intake passage when the throttle valve 36 is rotated by a throttle valve driving actuator 37.

The exhaust system 40 includes an exhaust manifold 41, an exhaust pipe 42, a turbine 43 of the exhaust-driven turbocharger 5, and a particulate filter (hereinafter simply referred to as "filter") 44. The exhaust ports of the cylinders 11 communicate with the filter 44 through the exhaust manifold 41 and the exhaust pipe 42. The exhaust pipe 42 is equipped with the turbine 43 of the exhaust-driven turbocharger 5 that is rotationally driven by the energy of exhaust gas. When the turbine 43 of the exhaust-driven turbocharger 5 is rotationally driven, the compressor 34 rotates in unison, and the intake air is thereby compressed. In the present embodiment, the turbine 43 of the exhaust-driven turbocharger 5 is equipped with a variable nozzle. When an opening degree of the variable nozzle is changed, the flow velocity of the exhaust gas supplied to a turbine blade changes, which changes the speed of the turbine 43. Accordingly, when the opening degree of the variable nozzle is changed, the supercharging pressure changes.

The filter 44 catches fine particles in the exhaust gas. As long as the exhaust system 40 is a device for cleaning up and discharging the exhaust gas to the outside air, the exhaust system 40 may include another exhaust gas control apparatus in place of or in addition to the filter 44. Such an exhaust gas control apparatus includes, for example, a three-way catalyst, a selective catalytic reduction NOx catalyst that reduces NOx in the exhaust gas, a NOx storage reduction catalyst, and an oxidation catalyst.

The EGR system 50 supplies some of the exhaust gas discharged from the engine body 10 to the intake passage. The EGR system 50 includes an EGR pipe 51, an EGR control valve 52, and an EGR cooler 53. The EGR pipe 51 is coupled with the exhaust manifold 41 and the intake manifold 31 to establish communication therebetween. The EGR pipe 51 is equipped with the EGR cooler 53 that cools the EGR gas that flows through the EGR pipe 51. In addition, the EGR pipe 51 is equipped with the EGR control valve 52 that can change an opening area of the EGR passage formed by the EGR pipe 51. By controlling the opening degree of the EGR control valve 52, the flow rate of the EGR gas that is recirculated from the exhaust manifold 41 to the intake manifold 31 is regulated. As a result, an EGR rate changes. The EGR rate is a ratio of an EGR gas amount to the total gas amount (sum of new air amount and EGR gas amount) that is supplied to the combustion chamber.

In the present embodiment, the exhaust-driven turbocharger 5 is used as a supercharger that boosts the pressure of intake gas. However, other superchargers, such as an electric compressor, and a mechanical supercharger, may be used as long as they can boost the pressure of intake gas.

The control device 60 of the internal combustion engine includes an electronic control unit (ECU) 61, and various sensors. The ECU 61 is configured from a digital computer, including a random-access memory (RAM) 63, a read-only memory (ROM) 64, a microprocessor (CPU) 65, an input port 66, and an output port 67, which are mutually connected through a bidirectional bus 62.

The intake pipe 32 is equipped with an air flowmeter 71 provided on the upstream side in an intake flow direction of the compressor 34 of the exhaust-driven turbocharger 5 to detect the flow rate of air flowing through the intake pipe 32. The throttle valve 36 is equipped with a throttle opening sensor 72 for detecting the opening degree of the throttle valve 36 (throttle opening). In the intake manifold 31, a pressure sensor (hereinafter referred to as "supercharging pressure sensor") 73 is provided to detect the pressure (supercharging pressure) of the intake gas in the intake manifold 31. The common rail 22 is equipped with a pressure sensor (hereinafter referred to as "fuel pressure sensor") 74 that detects the pressure of fuel in the common rail 22, i.e., the pressure of the fuel supplied to the fuel injection valves 21. In addition, in the exhaust manifold 41, a pressure sensor (hereinafter referred to as "exhaust pressure sensor") 75 is provided to detect the pressure (exhaust pressure) of the exhaust gas in the exhaust manifold 41. In addition, the filter 44 is equipped with a temperature sensor 76 that detects the temperature of the filter 44. The output of the air flowmeter 71, the throttle opening sensor 72, the supercharging pressure sensor 73, the fuel pressure sensor 74, the exhaust pressure sensor 75, and the temperature sensor 76 is input into the input port 66 through corresponding AD converters 68.

An accelerator pedal 77 is connected to a load sensor 78 that generates an output voltage that is proportional to a depression amount of the accelerator pedal 77. The output voltage of the load sensor 78 is input into the input port 66 through the corresponding AD converter 68. Therefore, in the present embodiment, the depression amount of the accelerator pedal 77 is used as engine load. A crank angle sensor 79 generates an output pulse, whenever a crankshaft of the engine body 10 rotates, for example, 10 degrees. The generated output pulse is input into the input port 66. The CPU 65 calculates engine speed from the output pulse of the crank angle sensor 79.

The output port 67 of the ECU 61 is connected to actuators, which control operation of the internal combustion engine 1, through corresponding drive circuits 69. In the example shown in FIG. 1, the output port 67 is connected to the variable nozzle of the exhaust-driven turbocharger 5, the fuel injection valves 21, the fuel pump 24, the throttle valve driving actuator 37, and the EGR control valve 52. The ECU 61 outputs control signals that control actuators of these components from the output port 67 to control operation of the internal combustion engine 1.

Figure 2:
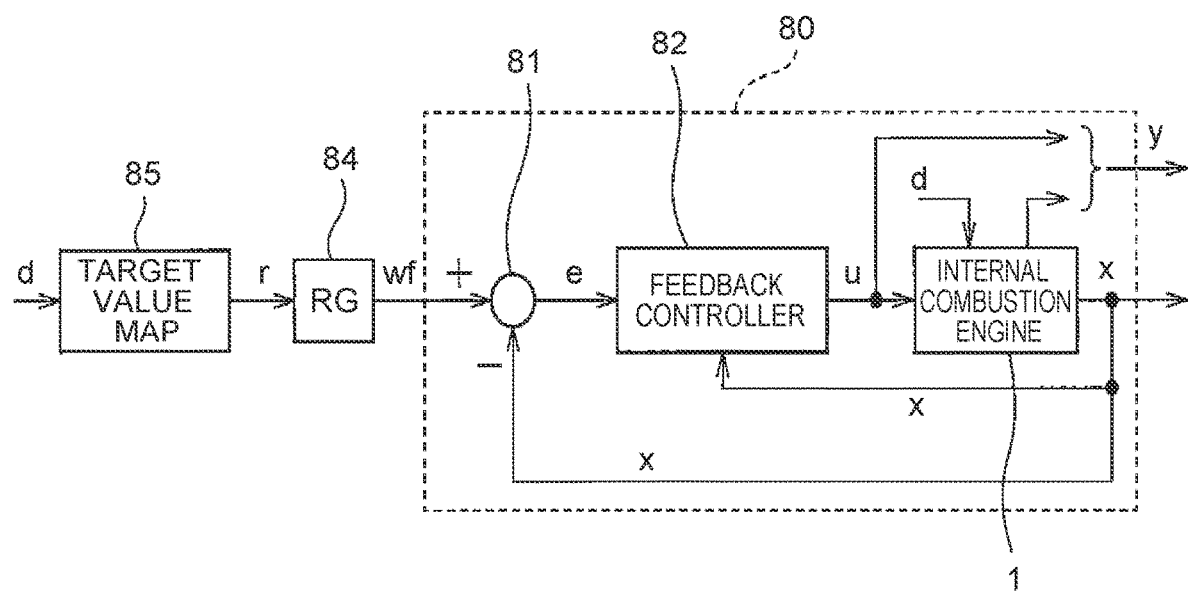
FIG. 2 is a block diagram schematically showing control performed in the control device.

Description is now given of the control of the internal combustion engine performed in the ECU 61 of the control device 60 with reference to FIG. 2. As shown in FIG. 2, the ECU 61 includes a target value map 85, a reference governor (RG) 84, a comparator 81, and a feedback controller 82. A portion encircled with a broken line in FIG. 2 functions as a closed-loop system 80 that performs feedback control such that a control output x of the internal combustion engine 1 approximates a target value wf.

Figure 3:
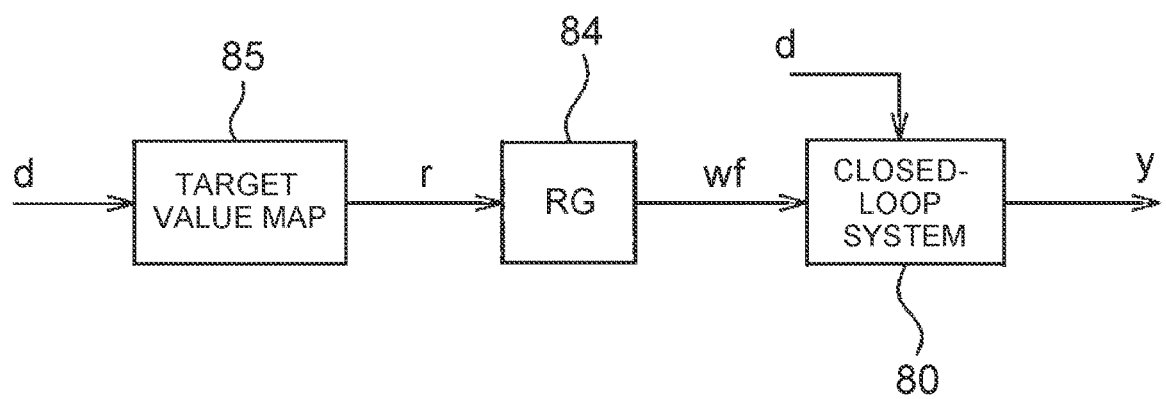
FIG. 3 shows feedforward control structure obtained by equivalent deformation of control structure of FIG. 2.

When the closed-loop system 80 is already designed, feedforward control structure of FIG. 3 may be obtained by performing equivalent deformation of the control structure of FIG. 2. Note that y in FIGS. 2 and 3 is the quantity of state of the internal combustion engine 1, the quantity of state being restricted to take limited values.

The comparator 81 calculates a deviation e (=wf−x) by subtracting the control output x from the target value wf, and inputs the deviation e into the feedback controller 82. The target value wf is input into the comparator 81 from the later-described reference governor 84, and the control output x is an output from the internal combustion engine 1. An exogenous input d is a given parameter of the internal combustion engine 1.

The feedback controller 82 determines control input u of the internal combustion engine 1 such that the control output x approximates the target value wf. That is, the feedback controller 82 determines the control input u such that the deviation e approximates zero. The feedback controller 82 uses publicly-known feedback control, such as PI control, and PID control. The feedback controller 82 inputs the control input u into the internal combustion engine 1. The feedback controller 82 also receives input of the control output x as state feedback. The input of the control output x to the feedback controller 82 may be omitted. The comparator 81 may be incorporated in the feedback controller 82.

As described before, in the closed-loop system 80, feedback control is performed such that the control output x approximates the target value wf. However, in actual control, the quantity of state y has a restriction attributed to the restrictions related to hardware or control. Accordingly, when a target value calculated without considering the restriction is input into the closed-loop system 80, the quantity of state y may conflict with the restriction, that may lead to a deteriorated transient response or unstable control.

Hence, in the present embodiment, the target value wf of the control output is calculated using the target value map 85 and the reference governor 84. When the exogenous input d is input into the target value map 85, the target value map 85 calculates a temporary target value r based on the exogenous input d, and outputs the temporary target value r to the reference governor 84. Therefore, the target value map 85 functions as a temporary target value calculation unit that calculates the temporary target value r of the control output based on a given operation parameter of the internal combustion engine 1.

The reference governor 84 calculates the target value wf by correcting the temporary target value r so as to increase the degree of satisfaction of a constraint condition with regard to the quantity of state y. Specifically, the reference governor 84 calculates the target value wf so as to decrease a value of an objective function set in consideration of the degree of satisfaction of the constraint condition with regard to the quantity of state y, and particularly a value of an objective function set to be smaller as the degree of satisfaction become higher.

In the present embodiment, the control output x is a supercharging pressure. The supercharging pressure input into the comparator 81 as the control output x is detected by the supercharging pressure sensor 73.

Figure 4:
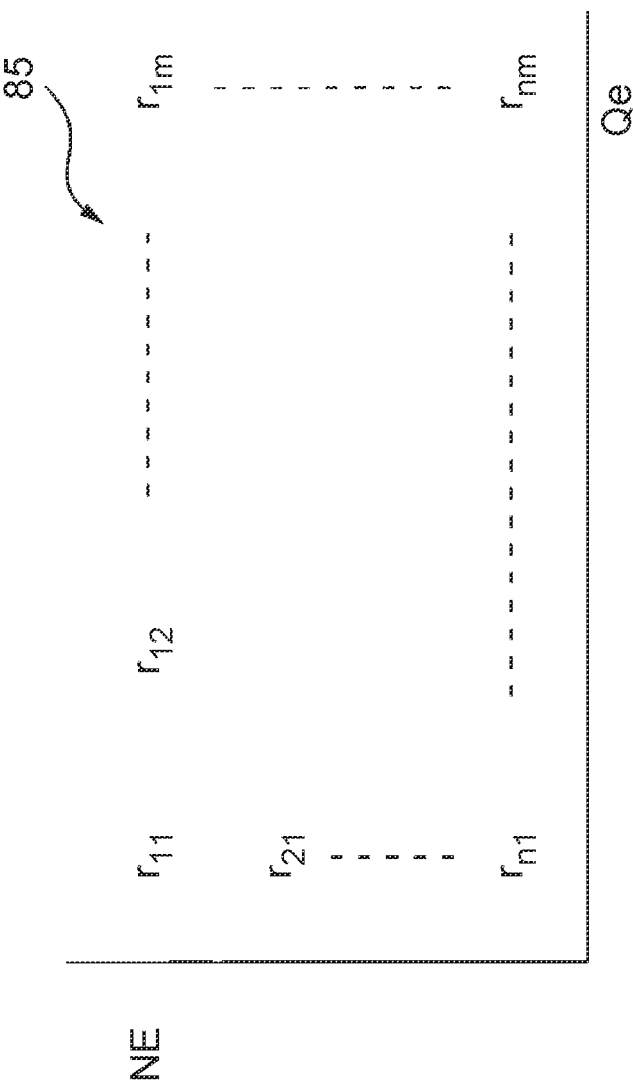
FIG. 4 is a map for calculating a temporary target value based on engine speed and a fuel injection amount.

The control input u for controlling the supercharging pressure includes an opening degree of the throttle valve 36, an opening degree of the EGR control valve 52, and an opening degree of the variable nozzle of the exhaust-driven turbocharger 5. The exogenous input d includes an engine speed and a fuel injection amount that are operation parameters of the internal combustion engine 1. The engine speed is detected by the crank angle sensor 79. The fuel injection amount is determined by the ECU 61 based on the engine load, or the like, detected by the load sensor 78. As shown in FIG. 4, the temporary target value r is expressed as a function of an engine speed NE and a fuel injection amount Qe in the target value map 85.

The supercharging pressure has an upper limit as a constraint condition because, when becoming too high, supercharging pressure may cause damage on the intake pipe, or the like. Accordingly, in the present embodiment, the quantity of state y is the supercharging pressure that is the control output x. Thus, in the present embodiment, the quantity of state y is the same parameter as the control output x. Accordingly, the quantity of state y (supercharging pressure) is always described as the control output x. Therefore, in the present embodiment, it can be said that the reference governor 84 calculates the target value wf by correcting the temporary target value r of the control output so as to increase the degree of satisfaction of the constraint condition with regard to the control output x.

In this case, an objective function J(w) is defined by expression (9) as follows:

$$J(w) = \|r-w\|^2 + S_{pim} \qquad (9)$$

Here, r is a temporary target value output from the target value map 85, and w is a provisional target value. An objective function $J_1(w)$ includes a correction term (right-side first term of expression (9)), and a first penalty function $S_{pim}$.

The correction term expresses a correction amount of the target value, which is a square of a difference between the temporary target value r and the provisional target value w. Accordingly, the value of the objective function J(w) becomes smaller as the difference between the temporary target value r and the provisional target value w is smaller, i.e., the correction amount of the target value is smaller.

The first penalty function $S_{pim}$ represents the degree of satisfaction of the constraint condition with regard to the supercharging pressure. The first penalty function $S_{pim}$ is defined by expression (10) as follows:

$$S_{pim} = p_1 \sum_{k=1}^{Nh} \max\{x_1(k) - x_{1Lim}, 0\} \qquad (10)$$

Here, $x_1(k)$ is a future prediction value of the supercharging pressure, and $p_1$ is a predetermined weight coefficient. In addition, $x_{1Lim}$ is an upper limit of the predetermined supercharging pressure, which represents a constraint condition with regard to the supercharging pressure. Moreover, k is a discrete time step, and Nh is the number of prediction steps (prediction horizon). The first penalty function $S_{pim}$ is configured such that when the future prediction value $x_1(k)$ of the supercharging pressure exceeds the upper limit $x_{1Lim}$, the excess amount is added to the objective function J(w) as a penalty. Accordingly, the value of the objective function J(w) becomes smaller as the sum of the excess amounts obtained when the future prediction value $x_1(k)$ of the supercharging pressure exceed the upper limit $x_{1Lim}$ is smaller.

Figure 5:
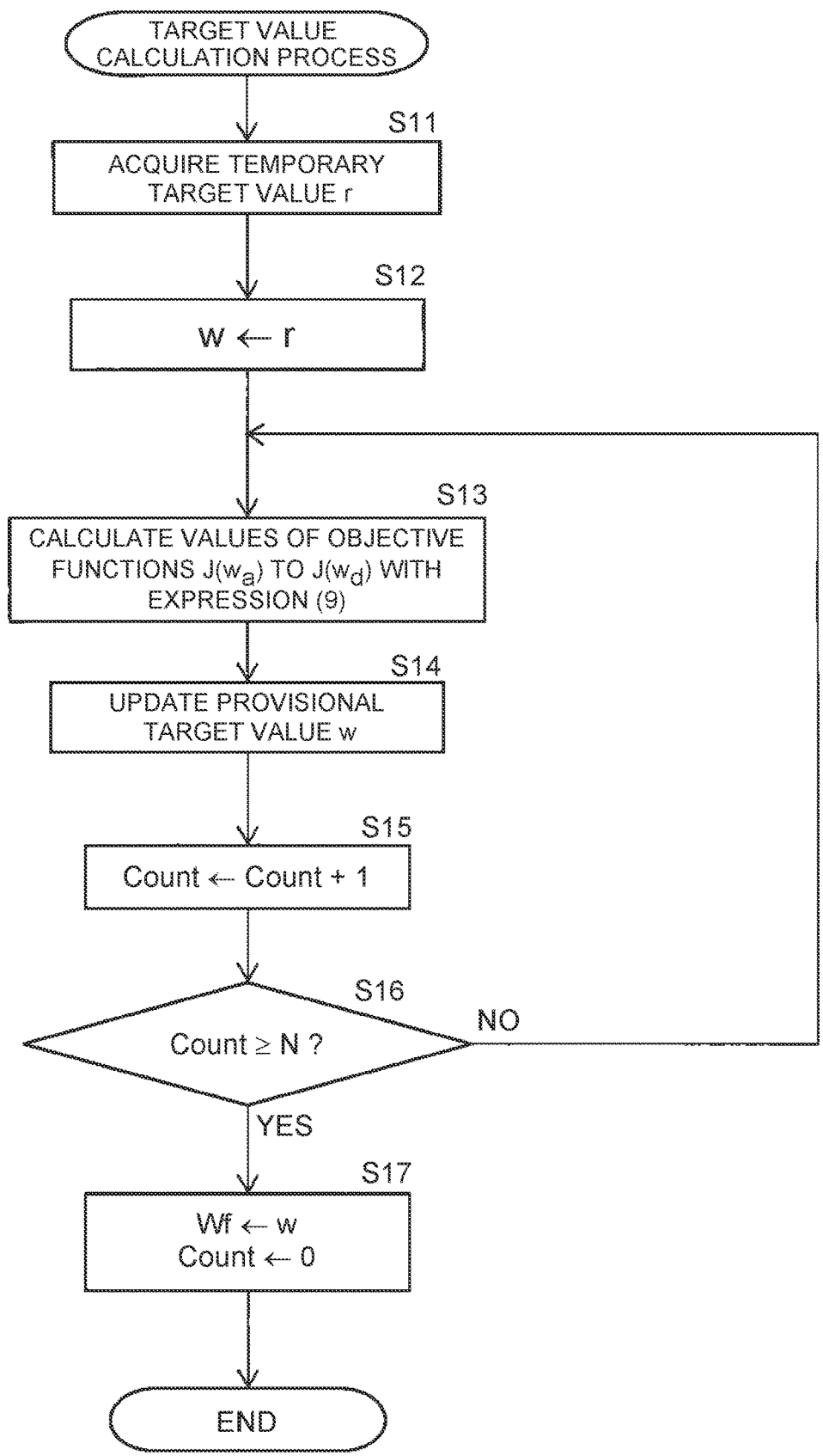
FIG. 5 is a flowchart showing a control routine for a target value calculation process in one embodiment.

As described before, the reference governor 84 calculates the target value wf so as to decrease the value of the objective function that is set to be smaller as the degree of satisfaction of the constraint condition with regard to the quantity of state y (equal to the control output x in the present embodiment) becomes higher. Hereinafter, with reference to FIG. 5, a target value calculation process in the reference governor 84 will be described. FIG. 5 is a flowchart showing a control routine for the target value calculation process in the present embodiment. The ECU 61 executes the control routine at specified time intervals.

First, in step S11, the ECU 61 acquires a temporary target value r of control output (supercharging pressure in the present embodiment) calculated based on the exogenous input d with the target value map 85. Next, in step S12, the ECU 61 sets the temporary target value r of the control output acquired in step S11 as an initial value of the provisional target value w.

Next, in step S13, to search an optimal value of the provisional target value w by a gradient method, the ECU 61 calculates, with the expression (9), values of objective functions $J(w_a)$ to $J(w_d)$ in four neighbor target values $w_a$ to $w_d$, which are separated by prescribed distances from the current provisional target value w. At the time, each term of the objective function J(w) in the expression (9) is calculated by using the neighbor target values $w_a$ to $w_d$ as the provisional target value w.

Next, in step S14, the ECU 61 moves the provisional target value w in the direction of the gradient calculated from the values of the objective functions $J(w_a)$ to $J(w_d)$. That is, the provisional target value w is updated. Specifically, the ECU 61 sets the provisional target value w to the neighbor target value, among the neighbor target values $w_a$ to $w_d$, which provides the smallest objective function J(w). Next, in step S15, the ECU 61 increments an update count by one. The update count indicates the number of times that the provisional target value w is updated. The initial value of the update count is zero.

Next, in step S16, the ECU 61 determines whether or not the update count is a prescribed number of times N or more. The prescribed number of times N is 5 to 200, for example. When the ECU 61 determines in step S16 that the update count is less than the prescribed number of times N, the present control routine returns to step S12. Therefore, the optimal value of the provisional target value w is repeatedly searched until the update count reaches the prescribed number of times N.

When the ECU 61 determines in step S16 that the update count is equal to or more than the prescribed number of times N, the present control routine proceeds to step S17. In step S17, the ECU 61 sets the target value wf of the control output to a final provisional target value w. In step S17, the ECU 61 also resets the update count to zero. After step S17, the ECU 61 ends the present control routine.

The provisional target value w may be updated by methods other than the gradient method as long as the provisional target value w can be updated such that the value of the objective function becomes smaller.

Now, in calculating the first penalty function $S_{pim}$, it is necessary to calculate a future prediction value $x_1(k)$ of the supercharging pressure up to a prescribed prediction period from the current time (prediction horizon). As a calculation method of the future prediction value $x_1(k)$ of the supercharging pressure, a calculation method using following expression (11) may be considered.

$$x_1(k+1)=f_1(x_1(k),w,d) \quad (11)$$

In expression (11), $f_1$ is a model function used in order to calculate the future prediction value $x_1(k)$ of the supercharging pressure. First, with use of $x_1(0)$ that is the supercharging pressure at the time of calculation, a predicted value $x_1(1)$ of the supercharging pressure that is one step ahead of the time of calculation is calculated. The supercharging pressure $x_1(0)$ at the time of calculation is detected by the supercharging pressure sensor 73. Then, the future prediction value $x_1(k)$ of the supercharging pressure is sequentially calculated up to a prediction value $x_1(Nh)$ of the supercharging pressure that is Nh steps ahead of the time of calculation. As a result, the total Nh future prediction values of the supercharging pressure are calculated. The prediction period is a value obtained by multiplying the time corresponding to one step by the number of prediction steps Nh.

However, in the case of calculating the future prediction value $x_1(k)$ of the supercharging pressure by the method using the expression (11), it is necessary to continuously perform calculation using expression (11) for the number of times equal to the number of the prediction steps Nh. In addition, the reference governor 84 repeatedly performs calculation of the objective function J(w) by the expression (9) in order to calculate the final target value wf by correcting the provisional target value w as described before. Therefore, when the future prediction value $x_1(k)$ of the supercharging pressure is calculated by the method using the expression (11), very high arithmetic load is imposed on the ECU 61.

Meanwhile, in the present embodiment, the feedback controller 82 performs feedback control of the supercharging pressure. When the control output is controlled in this way by the closed-loop system, such as feedback control, the response characteristic of the control output can often be approximated to a linear response. Therefore, the response characteristic of the supercharging pressure can also be approximated as the linear response, and particularly the response characteristic can be approximated on the assumption that a secondary delay occurs.

As shown in the expression (10), in calculating the first penalty function $S_{pim}$, the sum of the excess amounts when the future prediction value $x_1(k)$ of the supercharging pressure exceeds the upper limit $x_{1Lim}$ is used. When the response characteristic of the supercharging pressure is approximated as a linear response, the sum of the excess amounts when the future prediction value $x_1(k)$ of the supercharging pressure exceeds the upper limit $x_{1Lim}$ can approximately be calculated based on a maximum value of the excess amount when the future prediction value $x_1(k)$ of the supercharging pressure exceeds the upper limit $x_{1Lim}$. The maximum value of the excess amount when the future prediction value $x_1(k)$ of the supercharging pressure exceeds the upper limit $x_{1Lim}$ can be calculated based on a maximum value of an overshoot amount, as briefly described below with reference to FIG. 6.

Figure 6:
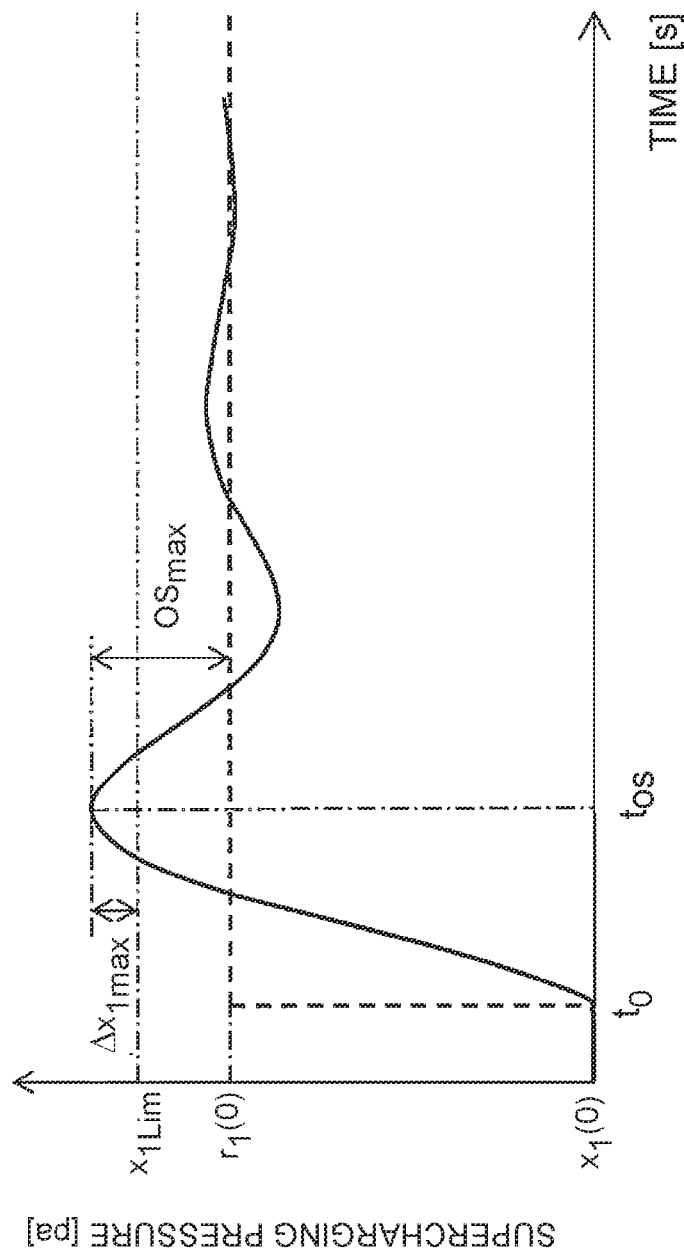
FIG. 6 is a time chart showing an actual supercharging pressure that changes with a change in target value of the supercharging pressure.

FIG. 6 is a time chart showing an actual supercharging pressure that changes with a change in target value of the supercharging pressure. A broken line in FIG. 6 indicates a transition of the target value of the supercharging pressure, and a solid line indicates a transition of the actual supercharging pressure (or a predicted value thereof).

As shown in FIG. 6, when the target value of the supercharging pressure changes stepwise to $r_1(0)$ at time $t_0$ in the state where an actual supercharging pressure is maintained at $x_1(0)$, the actual supercharging pressure transits as shown by the solid line of FIG. 6, for example. In the example shown in FIG. 6 in particular, the actual supercharging pressure changes beyond the target value in such a manner that the actual supercharging pressure overshoots. The excess amount of the actual supercharging pressure that exceeds the target value in this case is referred to as an overshoot amount hereinafter.

In the example shown in FIG. 6, the overshoot amount becomes the maximum at time $t_{os}$. Hereinafter, the time when the overshoot amount becomes the maximum is referred to as maximum time $t_{os}$, and the overshoot amount at the time is referred to as a maximum value $OS_{max}$ of the overshoot amount.

As a result of the overshoot amount becoming the maximum at time $t_{os}$, the actual supercharging pressure also becomes the maximum at time $t_{os}$. Accordingly, the excess amount of the future prediction value $x_1(k)$ of the supercharging pressure that exceeds the upper limit $x_{1Lim}$ also becomes the maximum at the time.

As described before, in calculating the first penalty function $S_{pim}$, a maximum value of the excess amount when the future prediction value $x_1(k)$ of the supercharging pressure exceeds the upper limit $x_{1Lim}$ is used. Therefore, in order to calculate the first penalty function $S_{pim}$, it is not necessary to calculate the future prediction value of the supercharging pressure over the prescribed prediction period, if the maximum value of the excess amount (or the maximum value $OS_{max}$ of the overshoot amount) when the future prediction value $x_1(k)$ of the supercharging pressure exceeds the upper limit $x_{1Lim}$ can be calculated as described before. Accordingly, in the present embodiment, the first penalty function $S_{pim}$ is calculated without calculating the future prediction value of the supercharging pressure over the prescribed prediction period as described below.

First, as described before, the response characteristic of the supercharging pressure can be approximated on the assumption that a secondary delay occurs. Therefore, when the supercharging pressure is simply expressed as x, the response characteristic of the supercharging pressure can be expressed by a differential equation indicated by following expression (12) that expresses a prediction model of a secondary delay system.

$$x'' + 2\zeta w_n x' + w_n^2 x = K w_n^2 w \quad (12)$$

In the expression (12), x" represents a second-order differential value of the supercharging pressure that is control output, and x' represents a first-order differential value thereof. Moreover, $\zeta$ represents a damping coefficient, $w_n$ represents natural angular frequency, and K represents gain. The damping coefficient $\zeta$, the natural angular frequency $w_n$, and the gain K are set based on control gain, or the like, of the feedback control performed in the feedback controller 82, for example. Therefore, the damping coefficient $\zeta$, the natural angular frequency $w_n$, and the gain K change with a change in control gain of the feedback control during operation of the internal combustion engine 1, for example.

It is not required to change all the damping coefficient $\zeta$, the natural angular frequency $w_n$, and the gain K in accordance with the control gain, or the like, of the feedback control. However, in that case, at least the value of one of the parameters used in the prediction model is still preferably set based on the control gain, or the like, of the feedback control performed in the feedback controller 82.

Here, when an initial value $x_1(0)$ of the supercharging pressure is set to $x_0 = 0$, an initial change rate $x_1'(0)$ of the supercharging pressure is set to $x'_0$, and Laplace transformation of the expression (12) is performed, following expression (13) is derived:

$$(s^2 x - s x_0 - x'_0) + 2\zeta w_n (s x - x_0) + w_n^2 x = K w_n^2 w \quad (13)$$

When $x_0 = 0$ is substituted to arrange the expression (13), the expression (13) can be deformed into following expression (14):

$$(s^2 + 2\zeta w_n s + w_n^2) x = K w_n^2 w + x'_0 \quad (14)$$

In order to calculate a step response, w=1/s is substituted to arrange the expression (14). As a result, the expression (14) can be expressed as expression (15) below:

$$x = \frac{K \omega_n^2 + x'_0 s}{s(s^2 + 2\zeta \omega_n s + \omega_n^2)} \quad (15)$$

When $w_d$ is defined as following expression (16), and the expression (15) is decomposed into partial fractions, then A, B, C are expressed as following expressions (18), (19), (20), respectively:

$$\omega_d = \omega_n \sqrt{1 - \zeta^2} \quad (16)$$

$$x = \frac{A}{s} + B \frac{s + \zeta \omega_n}{(s + \zeta \omega_n)^2 + \omega_d^2} + C \frac{\omega_d}{(s + \zeta \omega_n)^2 + \omega_d^2} \quad (17)$$

$$A = K \quad (18)$$

$$B = -K \quad (19)$$

$$C = \frac{x'_0 - K \zeta \omega_n}{\omega_d} \quad (20)$$

The expressions (18), (19) are substituted into the expression (17) and are subjected to inverse Laplace transformation. As a result, following expression (21) is obtained:

$$x(t) = K - K e^{-\zeta \omega_n t} \cos \omega_d t + C e^{-\zeta \omega_n t} \sin \omega_d t \quad (21)$$

Therefore, the transition of the supercharging pressure at the time of a stepwise change in the target value of the supercharging pressure can be expressed by the expression (21) above. In the expression (21), t represents lapsed time from the time when the target value of the supercharging pressure changes stepwise.

Here, when the overshoot amount becomes the maximum, the change rate of the supercharging pressure is zero. Therefore, when the overshoot amount becomes the maximum, a differential value x'(t) in the expression (21) becomes zero. Therefore, the time when the differential value x'(t) in the expression (21) becomes zero is calculated below.

First, when the expression (21) is differentiated, following expression (22) is obtained. Note that D, E in the expression (22) are expressed by following expressions (23), (24), respectively:

$$x'(t) = e^{-\zeta \omega_n t} (D \cos \omega_d t + E \sin \omega_d t) \quad (22)$$

$$D = K \zeta \omega_n + C \omega_d = x'_0 \quad (23)$$

$$E = K \omega_d - C \zeta \omega_n = \frac{K \omega_n - x'_0 \zeta}{\sqrt{1 - \zeta^2}} \quad (24)$$

Here, when $\varphi$ is defined as following expression (25), the expression (22) can be deformed into following expression (26):

$$\varphi = \tan^{-1} \frac{x'_0 \sqrt{1 - \zeta^2}}{K \omega_n - x'_0 \zeta} \quad (25)$$

$$x'(t) = e^{-\zeta \omega_n t} \sqrt{D^2 + E^2} \sin(\varphi + \omega_d t) \quad (26)$$

In the expression (26), the first time when x'(t)=0 is established is obtained by solving $\varphi + \omega_d t = \pi$, as shown in following expression (27):

$$t_{os} = \frac{\pi - \varphi}{\omega_d} \quad (27)$$

The time $t_{os}$ obtained in the expression (27) represents the time when the overshoot amount described before becomes the maximum, i.e., the time when the excess amount of the supercharging pressure that exceeds the upper limit becomes the maximum.

When the time $t_{os}$ obtained by the expression (27) is substituted into the expression (21), and the gain K is set to 1 (difference between the current value and target value of the supercharging pressure is assumed to be 1), following expression (28) is obtained:

$$x(t) = 1 - e^{-\zeta\omega_n t_{os}}\cos(\pi - \varphi) + Ce^{-\zeta\omega_n t_{os}}\sin(\pi - \varphi) \qquad (28)$$
$$= 1 + \frac{e^{-\zeta\omega_n t_{os}}}{\sqrt{D^2 + E^2}}(E + CD)$$
$$= 1 + \mu$$

In the expression (28), $\mu$ is expressed by following expression (29):

$$\mu = \frac{e^{-\zeta\omega_n t_{os}}}{\sqrt{D^2 + E^2}}(E + CD) \qquad (29)$$

As described before, $\mu$ obtained in the expression (29) represents a predicted maximum value of the overshoot amount when the difference between the current value and the target value of the supercharging pressure is assumed to be 1. Therefore, the predicted maximum value of the overshoot amount when the current supercharging pressure is set to x(t) and the target value is set to r(t) is expressed by following expression (30). In addition, a supercharging pressure $x_{1max}$ when the overshoot amount becomes the maximum is expressed by following expression (31):

$$OS_{max} = \mu(r_1(t) - x_1(t)) \qquad (30)$$

$$x_{1max} = r_1(t) + OS_{max} \qquad (31)$$

When the thus-calculated supercharging pressure $x_{1max}$ when the overshoot amount becomes the maximum is used, the first penalty function $S_{pim}$ can be calculated with following expression (32). In the expression (32), $\Delta x_{1max}$ represents a difference between the supercharging pressure when the overshoot amount becomes the maximum and the upper limit, i.e., a maximum excess amount of the future prediction value $x_1$ of the supercharging pressure that exceeds the upper limit $x_{1Lim}$. In the expression (32), $\alpha$ is a coefficient for converting the maximum value of the excess amount when the future prediction value $x_1(k)$ of the supercharging pressure exceeds the upper limit $x_{1Lim}$ into the sum of the excess amounts of the future prediction value $x_1(k)$ of the supercharging pressure that exceeds the upper limit $x_{1Lim}$.

$$S_{pim} = \alpha p_1(x_{1max} - x_{1Lim}) = \alpha p_1 \Delta x_{1max} \qquad (32)$$

Thus, in the present embodiment, the objective function is calculated based on the difference between the supercharging pressure when the overshoot amount becomes the maximum and the upper limit, that is, the maximum excess amount of the future prediction value $x_1$ of the supercharging pressure that exceeds the upper limit $x_{1Lim}$. In the present embodiment in particular, the value of the objective function is calculated such that as the future prediction value $x_1$ of the supercharging pressure becomes larger beyond the upper limit $x_{1Lim}$, the degree of satisfaction of constraint condition becomes lower and therefore the value of the objective function becomes larger. In other words, as an estimated maximum value of the overshoot amount becomes larger beyond an upper limit ($x_{1Lim} - r_1(0)$) corresponding to the upper limit $x_{1Lim}$ of the supercharging pressure, the degree of satisfaction of constraint condition becomes lower, and therefore, the value of the objective function is calculated to be larger.

Figure 7:
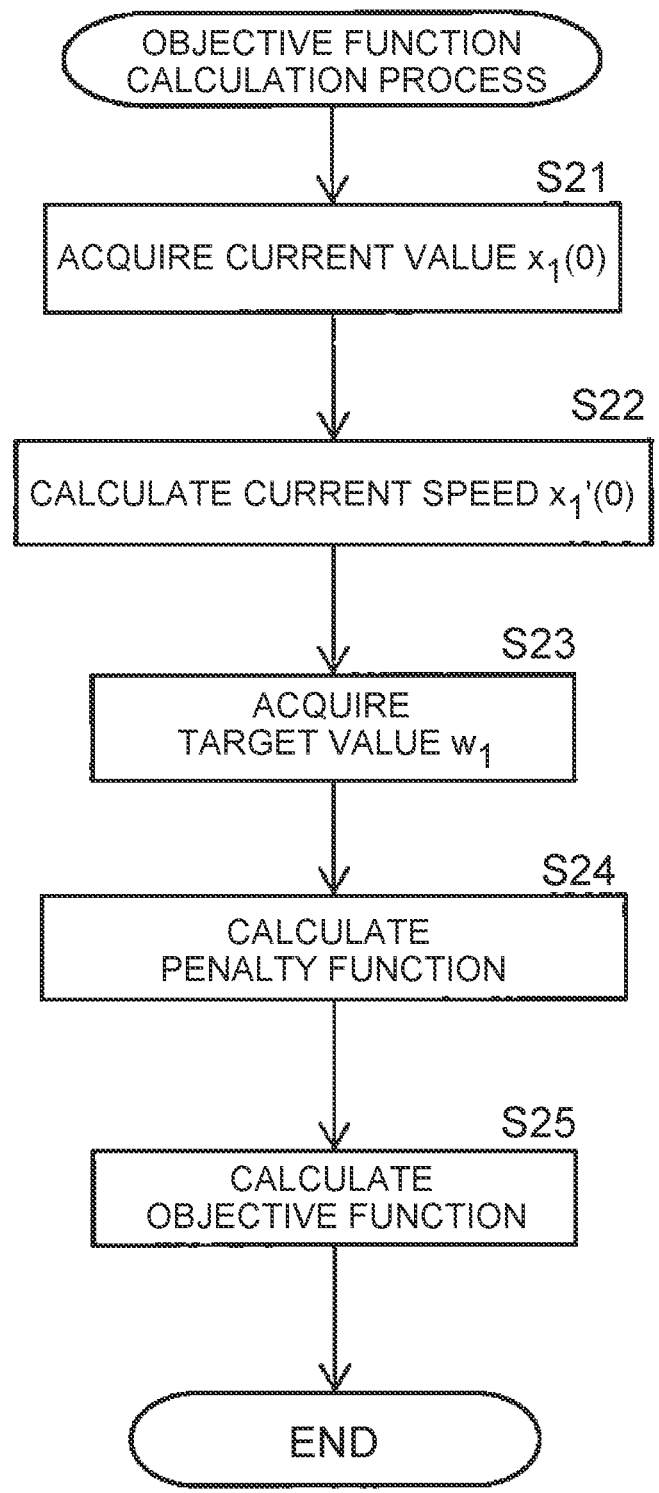
FIG. 7 is a flow chart showing a control routine for calculation process of an objective function.

In the present embodiment, the objective function is calculated as described in the foregoing. Hereinafter, with reference to FIG. 7, an objective function value calculation process in the reference governor 84 will be described. FIG. 7 is a flowchart showing a control routine for the objective function value calculation process in the present embodiment. The illustrated control routine is executed in step S13 of FIG. 5.

First, in step S21, a current value $x_1(0)$ of the supercharging pressure is acquired. The current value $x_1(0)$ of the supercharging pressure is acquired from the output of the supercharging pressure sensor 73. Next, in step S22, a current change rate $x_1'(0)$ of the supercharging pressure is calculated. The ECU 61 calculates the current change rate $x_1'(0)$ of the supercharging pressure based on the current value $x_1(0)$ of the supercharging pressure and a past value of the supercharging pressure. Next, in step S23, a target value $w_1$ of the supercharging pressure is acquired. The target value $w_1$ of the supercharging pressure is a value calculated or acquired in step S12 or S14 of FIG. 5.

Next, in steps S24, S25, an objective function value is calculated with a prediction model. Here, the first penalty function $S_{pim}$ is calculated by the expression (32), based on the current value $x_1(0)$ of the supercharging pressure acquired in step S21, the current change rate $x_1'(0)$ of the supercharging pressure calculated in step S22, and the target value $w_1$ of the supercharging pressure. The supercharging pressure $x_{1max}$ in the expression (32) is calculated by the expression (31), and the predicted maximum value $OS_{max}$ of the overshoot in the expression (31) is calculated by the expression (30). A value $\mu$ in the expression (30) is calculated by the expression (29), and the coefficients C, D, E and $t_{os}$ in the expression (29) are calculated by the expression (20), (23), (24), and (27), respectively. The value $\varphi$ in the expression (27) is calculated by the expression (25).

Next, in step S25, the objective function value is calculated by substituting the $S_{pim}$ calculated in step S24 into the expression (9), and the control routine is ended.

As described in the foregoing, in the present embodiment, the first penalty function $S_{pim}$ can be calculated by a single calculation session, without repeatedly calculating the future prediction value of the supercharging pressure over a prediction period. Hence, according to the present embodiment, the arithmetic load at the time of calculating the first penalty function $S_{pim}$ and by extension, the arithmetic load at the time of calculating the target value of the supercharging pressure can be reduced.

In the embodiment, in calculating the first penalty function $S_{pim}$, the predicted maximum value $OS_{max}$ of the overshoot amount is calculated. In calculating the predicted maximum value $OS_{max}$ of the overshoot amount, a current change rate of the supercharging pressure is used. Thus, the prediction accuracy of the predicted maximum value $OS_{max}$ can be enhanced by calculating the predicted maximum value $OS_{max}$ using the current change rate of the supercharging pressure.

Figure 8A:
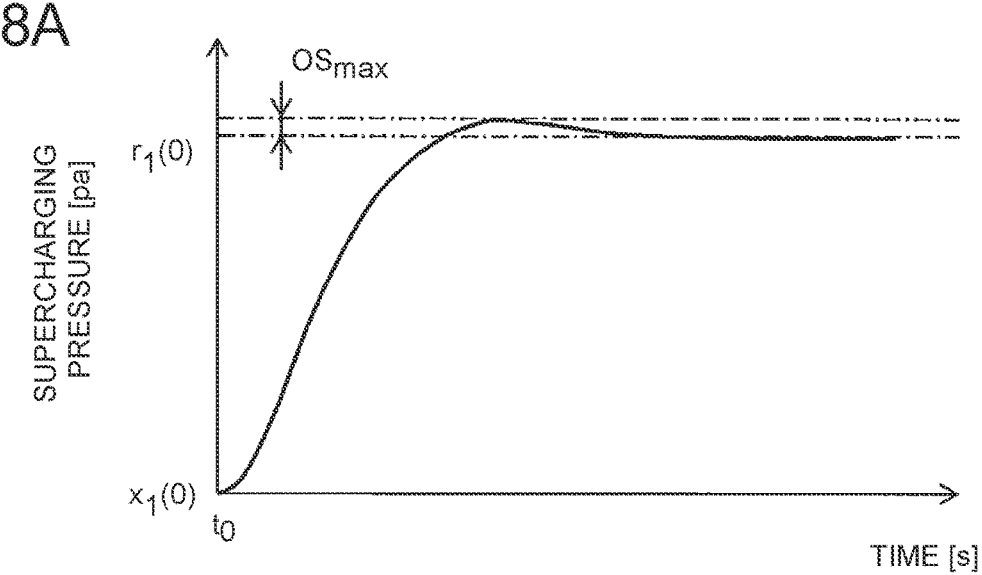
FIG. 8A is a time chart showing a transition of the supercharging pressure when a change rate of the supercharging pressure at given time is zero.
Figure 8B:
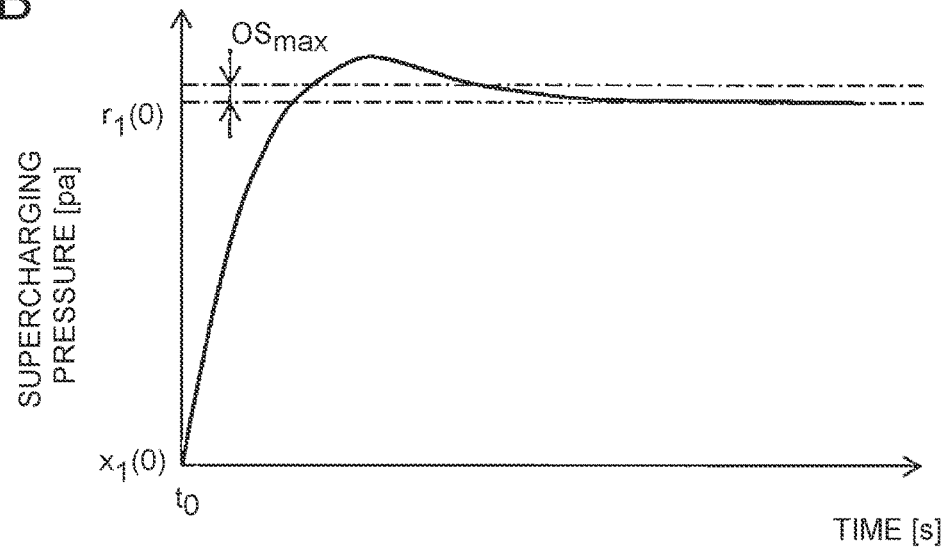
FIG. 8B is a time chart showing one example of a transition of the supercharging pressure when the change rate of the supercharging pressure at given time is a prescribed speed.
Figure 8C:
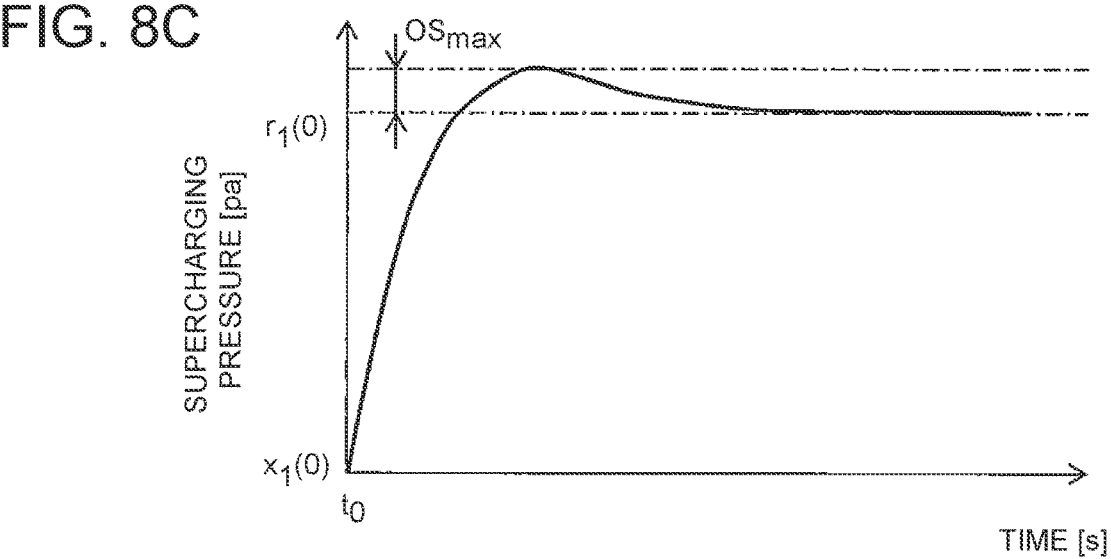
FIG. 8C is a time chart showing one example of a transition of the supercharging pressure when the change rate of the supercharging pressure at given time is a prescribed speed.

FIGS. 8A, 8B, and 8C are time charts showing transitions of the supercharging pressure in the case where the current value of the supercharging pressure is $x_1(0)$, and the target value is $r_1(0)$. FIG. 8A shows a transition of the supercharging pressure when the change rate of the supercharging pressure at time $t_0$ is zero. FIG. 8B and FIG. 8C show transitions of the supercharging pressure when the change rate of the supercharging pressure at time $t_0$ is a prescribed speed other than zero. In FIGS. 8A and 8B, the predicted maximum value $OS_{max}$ of the overshoot amount is a value calculated using a prediction model where an initial change rate of the supercharging pressure (change rate of the supercharging pressure at time $t_0$) is zero. Meanwhile, in FIG. 8C, the predicted maximum value $OS_{max}$ of the overshoot amount is a value calculated using a prediction model where an initial change rate is input as the initial change rate of the supercharging pressure as in the present embodiment.

Even in the prediction model where the initial change rate of the supercharging pressure is zero, a predicted maximum value $OS_{max}$ calculated by the prediction model practically coincides with an actual maximum value of the overshoot amount as shown in FIG. 8A, when the change rate of the supercharging pressure at time $t_0$ is zero. In the prediction model where the initial change rate of the supercharging pressure is zero, an actual maximum value of the overshoot amount is largely different from a predicted maximum value $OS_{max}$ calculated by the prediction model, when the change rate of the supercharging pressure at time $t_0$ is a prescribed speed as shown in FIG. 8B. Therefore, when the target value of the supercharging pressure is calculated using the predicted maximum value $OS_{max}$ calculated in this way, values that are not optimal may be calculated.

According to the present embodiment, in creating the prediction model of a secondary delay system that indicates the response characteristic of the supercharging pressure, the initial change rate of the supercharging pressure is taken into consideration. As a result, as shown in FIG. 8C, even in the case where the change rate of the supercharging pressure at time $t_0$ is a prescribed speed other than zero, the predicted maximum value $OS_{max}$ of the overshoot amount coincides with the actual maximum value of the overshoot amount. In the internal combustion engine 1 in particular, the supercharging pressure changes frequently, and therefore the initial change rate of the supercharging pressure is often not zero. In the present embodiment, even when the supercharging pressure changes frequently in such a manner, the predicted maximum value $OS_{max}$ of the overshoot amount can be calculated relatively correctly. As a result, an optimal target value can be calculated by the reference governor 84.

Now, in the embodiment, in calculating the objective function $J(w)$, a constraint condition with regard to the supercharging pressure is taken into consideration. However, in calculating the objective function $J(w)$, a constraint condition with regard to other quantities of state, such as turbine speed and exhaust pressure, may be taken into consideration. Hereinafter, description is given of the case where the turbine speed in addition to the supercharging pressure are taken into consideration as a constraint condition.

In this case, the objective function is expressed by expression (33) as follows:

$$J(w) = \|r - w\|^2 + S_{pim} + S_{Nt} \quad (33)$$

In the expression (33), $S_{Nt}$ is a second penalty function that expresses the degree of satisfaction of a constraint condition with regard to the turbine speed. The second penalty function $S_{Nt}$ is defined by following expression (34):

$$S_{Nt} = p_2 \sum_{k=1}^{Nh} \max\{y_1(k) - y_{1Lim}, 0\} \quad (34)$$

Here, $y_1(k)$ is a future prediction value of the turbine speed, $y_{1Lim}$ is a predetermined upper limit of the turbine speed, and $p_2$ is a predetermined weight coefficient. The second penalty function $S_{Nt}$ is configured such that when the future prediction value $y_1(k)$ of the turbine speed exceeds the upper limit $y_{1Lim}$, the excess amount is added to the objective function $J(w)$ as a penalty. Accordingly, the value of the objective function $J(w)$ becomes smaller as the sum of the excess amounts obtained when the future prediction value $y_1(k)$ of the turbine speed exceeds the upper limit $y_{1Lim}$ is smaller.

The reference governor 84 calculates the future prediction value $y_1(k)$ of the turbine speed using a prediction model of the internal combustion engine 1. For example, the reference governor 84 calculates the future prediction value $y_1(k)$ of the turbine speed with following expression (35):

$$y_1(k+1) = f_2(y_1(k), w, d) \quad (35)$$

The value $f_2$ is a model function used in order to calculate the future prediction value $y_1(k)$ of the turbine speed. First, with use of $y_1(0)$ that is the turbine speed at the time of calculation, a predicted value $y_1(1)$ of the turbine speed that is one step ahead of the time of calculation is calculated. The turbine speed $y_1(0)$ at the time of calculation is detected by, for example, a turbine speed sensor (not illustrated) provided in the turbine 43. Then, the future prediction value $y_1(k)$ of the turbine speed is sequentially calculated up to a prediction value $y_1(Nh)$ of the turbine speed that is Nh steps ahead of the time of calculation. As a result, the total Nh future prediction values of the turbine speed are calculated.

Even when restrictions are imposed on a plurality of quantities of state, the target value of the supercharging pressure can be set so as to increase the overall degree of satisfaction of the constraint conditions with regard to the quantities of state, by calculating the objective functions as in the present modification. Although repetitive calculation is necessary in calculation of the value of the second penalty function, the repetitive becomes unnecessary in calculation of the value of the first penalty function as described before. This makes it possible to reduce the arithmetic load at the time of calculating the target value of the supercharging pressure.

Description is now given of a control device according to a second embodiment. The configuration and control of the control device according to the second embodiment are basically similar to the configuration and control of the control device according to the first embodiment. Hereinafter, description will mainly be given of a difference from the control device according to the first embodiment.

The control device according to the first embodiment is a control device in the case where both the control output x and the quantity of state y having a constraint condition are the supercharging pressure. Contrary to this, the control device according to the second embodiment is a control device in the case where both the control output x and the quantity of state y having a constraint condition are an EGR rate. The control input in this case includes, for example, an opening degree of the throttle valve 36, an opening degree of the EGR control valve 52, and an opening degree of the variable nozzle of the exhaust-driven turbocharger 5.

Here, when the EGR rate becomes too high, oxygen becomes insufficient, which may cause undesirable circumstances such as misfire. Hence, the EGR rate has an upper limit as a constraint condition. Accordingly, the objective function J(w) in the present embodiment is defined by following expression (36), and a third penalty function $S_{EGR}$ is defined by following expression (37):

$$J(w) = \|r - w\|^2 + S_{EGR} \quad (36)$$

$$S_{EGR} = p_3 \sum_{k=1}^{Nh} \max\{x_2(k) - x_{2Lim}, 0\} \quad (37)$$

Here, $x_2(k)$ is a future prediction value of the EGR rate, $x_{2Lim}$ is a predetermined upper limit of the EGR rate, and $p_3$ is a predetermined weight coefficient. The third penalty function $S_{EGR}$ is configured such that when the future prediction value $x_2(k)$ of the EGR rate exceeds the upper limit $x_{2Lim}$, the excess amount is added to the objective function J(w) as a penalty. Accordingly, the value of the objective function J(w) becomes smaller as the sum of the excess amounts obtained when the future prediction value $x_2(k)$ of the EGR rate exceeds the upper limit $x_{2Lim}$ is smaller.

Here, the response characteristic of the EGR rate can also be approximated as a linear response, and particularly the response characteristic can be approximated on the assumption that a secondary delay occurs. When the response characteristic of the EGR rate is approximated as a linear response, the sum of excess amounts when the future prediction value $x_2(k)$ of the EGR rate exceeds the upper limit $x_{2Lim}$ can be calculated based on a maximum value of the excess amount when the future prediction value $x_2(k)$ of the EGR rate exceeds the upper limit $x_{2Lim}$. Therefore, the third penalty function $S_{EGR}$ can also be calculated from the maximum value of an overshoot amount of the EGR rate.

The EGR rate $x_{2max}$ when the overshoot amount of the EGR rate becomes the maximum is calculated by following expression (38), and μ in the expression (38) is calculated by following expression (39). Coefficients C, D, E, and $t_{os}$ in the expression (39) are calculated by the expression (16), (20), (23) to (25), and (27).

$$x_{2max} = r_2(t) + OS_{max} = r_2(t) + \mu(r_2(t) - x_2(t)) \quad (38)$$

$$\mu = \frac{e^{-\zeta \omega_n t_{os}}}{\sqrt{D^2 + E^2}}(E + CD) \quad (39)$$

As described before, when the maximum value $OS_{max}$ of the overshoot amount of the EGR rate is calculated, the arithmetic load at the time when the reference governor 84 calculates the target value of the EGR rate can be reduced. Even when the internal combustion engine 1 performs transient operation, the predicted maximum value $OS_{max}$ of the overshoot amount of the EGR rate can be calculated relatively correctly. As a result, the reference governor 84 can calculate an optimal target value.

In actual calculation of the objective function, a current EGR rate is estimated by a publicly-known method, based on the opening degree of the EGR control valve 52, or the like. A current change rate of the EGR rate is calculated in the ECU 61 based on the current value of the EGR rate, and a past estimated value of the EGR rate.

Also in the present embodiment, in calculating the objective function J(w), a constraint condition with regard to the quantity of state other than the EGR rate, such as the turbine speed and exhaust pressure, may be taken into consideration as in the modification of the first embodiment.

Description is now given of a control device according to a third embodiment. The configuration and control of the control device according to the third embodiment are basically similar to the configuration and control of the control device according to the first embodiment. Hereinafter, description will mainly be given of a difference from the control device according to the first embodiment.

The control device according to the first embodiment is a control device in the case where both the control output x and the quantity of state y having a constraint condition are the supercharging pressure. Contrary to this, the control device according to the third embodiment is a control device in the case where both the control output x and the quantity of state y having a constraint condition are the temperature of the filter 44. The control input in this case includes, for example, timing and amount of fuel injection from the fuel injection valves 21, an opening degree of the EGR control valve 52, and an opening degree of the variable nozzle of the exhaust-driven turbocharger 5.

Here, when the temperature of the filter 44 becomes too high, it causes undesirable circumstances such as erosion of the filter. Accordingly, the temperature of the filter 44 has an upper limit as a constraint condition. Accordingly, the objective function J(w) in the present embodiment is defined by following expression (40), and a fourth penalty function $S_{TF}$ is defined by following expression (41):

$$J(w) = \|r - w\|^2 + S_{TF} \quad (40)$$

$$S_{TF} = p_4 \sum_{k=1}^{Nh} \max\{x_3(k) - x_{3Lim}, 0\} \quad (41)$$

Here, $x_3(k)$ is a future prediction value of the temperature of the filter 44, $x_{3Lim}$ is an upper limit of the temperature of the filter 44, and $p_4$ is a predetermined weight coefficient. The fourth penalty function $S_{TF}$ is configured such that when the future prediction value $x_3(k)$ of the temperature of the filter 44 exceeds the upper limit $x_{3Lim}$ the excess amount is added to the objective function J(w) as a penalty. Accordingly, the value of the objective function J(w) becomes smaller as the sum of the excess amounts obtained when the future prediction value $x_3(k)$ of the temperature of the filter 44 exceeds the upper limit $x_{3Lim}$ is smaller.

Here, the response characteristic of the temperature of the filter 44 can also be approximated as a linear response, and particularly the response characteristic can be approximated on the assumption that a secondary delay occurs. When the response characteristic of the temperature of the filter 44 is approximated as a linear response, the sum of the excess amounts when the future prediction value $x_3(k)$ of the temperature of the filter 44 exceeds the upper limit $x_{3Lim}$ can also be calculated based on a maximum value of the excess amount when the future prediction value $x_3(k)$ of the temperature of the filter 44 exceeds the upper limit $x_{3Lim}$. Therefore, the fourth penalty function $S_{TF}$ can also be calculated from the maximum value of an overshoot amount of the temperature of the filter 44.

A temperature $x_{3max}$ of the filter 44 when the overshoot amount of the temperature of the filter 44 becomes the maximum is calculated by subsequent expression (42), and μ in the expression (42) is calculated by the expression (39) as in the above embodiment.

$$x_{3max} = r_3(t) + OS_{max} = r_3(t) + \mu(r_3(t) - x_3(t)) \quad (42)$$

As described before, when the maximum value $OS_{max}$ of the overshoot amount of the temperature of the filter 44 is calculated, the arithmetic load at the time when the reference governor 84 calculates the target value of the temperature of the filter 44 can be reduced. Even when the internal combustion engine 1 performs transient operation, the predicted maximum value $OS_{max}$ of the overshoot amount of the temperature of the filter 44 can be calculated relatively correctly. As a result, the reference governor 84 can calculate an optimal target value.

In actual calculation of the objective function, the temperature of the current filter 44 is detected by, for example, a temperature sensor 76 that detects the temperature of the filter 44. A current change rate of the temperature of the filter 44 is calculated in the ECU 61, based on the current value of the temperature of the filter 44 and a temperature of the filter 44 detected in the past by the temperature sensor 76.

Also in the present embodiment, in calculating the objective function $J(w)$, a constraint condition with regard to the quantity of state other than the EGR rate, such as turbine speed, and exhaust pressure, may be taken into consideration as in the modification of the first embodiment.

Description is now given of a control device according to a fourth embodiment. The configuration and control of the control device according to the fourth embodiment are basically similar to the configuration and control of the control device according to the first embodiment. Hereinafter, description will mainly be given of a difference from the control device according to the first embodiment.

The control device according to the first embodiment is a control device in the case where both the control output x and the quantity of state y having a constraint condition are the supercharging pressure. Contrary to this, the control device according to the fourth embodiment is a control device in the case where both the control output x and the quantity of state y having a constraint condition are fuel pressure. The control input in this case is electric power supplied to the fuel pump 24, for example.

Here, when the fuel pressure becomes too high, it causes undesirable circumstances such as damage of the fuel injection valves 21. Accordingly, the fuel pressure has an upper limit as a constraint condition. Accordingly, the objective function $J(w)$ in the present embodiment is defined by following expression (43), and a fifth penalty function $S_{PF}$ is defined by following expression (44):

$$J(w) = \|r - w\|^2 + S_{PF} \quad (43)$$

$$S_{PF} = p_5 \sum_{k=1}^{Nh} \max\{x_4(k) - x_{4Lim}, 0\} \quad (44)$$

Here, $x_4(k)$ is a future prediction value of the fuel pressure, $x_{4Lim}$ is a predetermined upper limit of the fuel pressure, and $p_5$ is a predetermined weight coefficient. The fifth penalty function $S_{PF}$ is configured such that when the future prediction value $x_4(k)$ of the fuel pressure exceeds the upper limit $x_{4Lim}$, the excess amount is added to the objective function $J(w)$ as a penalty. Accordingly, the value of the objective function $J(w)$ becomes smaller as the sum of the excess amounts obtained when the future prediction value $x_4(k)$ of the fuel pressure exceeds the upper limit $x_{4Lim}$ is smaller.

Here, the response characteristic of the fuel pressure can also be approximated as a linear response, and particularly the response characteristic can be approximated on the assumption that a secondary delay occurs. When the response characteristic of the fuel pressure is approximated as a linear response, the sum of the excess amounts when the future prediction value $x_4(k)$ of the fuel pressure exceeds the upper limit $x_{4Lim}$ can be calculated based on a maximum value of the excess amount when the future prediction value $x_4(k)$ of the fuel pressure exceeds the upper limit $x_{4Lim}$. Therefore, the fifth penalty function $S_{PF}$ can also be calculated from the maximum value of an overshoot amount of the fuel pressure.

A fuel pressure $x_{4max}$ when the overshoot amount of the fuel pressure becomes the maximum is calculated by following expression (45), and $\mu$ in the expression (45) is calculated by the expression (39) as in the above embodiment.

$$x_{4max} = r_4(t) + OS_{max} = r_{4(t)} + \mu(r_4(t) - x_4(t)) \quad (45)$$

As described before, when the maximum value $OS_{max}$ of the overshoot amount of the fuel pressure is calculated, the arithmetic load at the time when the reference governor 84 calculates the target value of the fuel pressure can be reduced. Even when the internal combustion engine 1 performs transient operation, the predicted maximum value $OS_{max}$ of the overshoot amount of the fuel pressure can be calculated relatively correctly. As a result, the reference governor 84 can calculate an optimal target value.

In actual calculation of the objective function, a current fuel pressure is detected by, for example, a fuel pressure sensor 74 that detects the pressure of the fuel in the common rail 22. A current change rate of the fuel pressure is calculated in the ECU 61, based on the current value of the fuel pressure and a fuel pressure detected in the past by the fuel pressure sensor 74.

Also in the present embodiment, in calculating the objective function $J(w)$, a constraint condition with regard to the quantity of state other than the EGR rate, such as turbine speed, and exhaust pressure, may be taken into consideration as in the modification of the first embodiment.

As described in the foregoing, the control devices according to the embodiments include a reference governor. The reference governor calculates, with a prediction model derived assuming that a secondary delay occurs in a response of control output, a predicted maximum overshoot value of the control output from a target value, based on a current value of the control output (such as the supercharging pressure, the EGR rate, the temperature of the filter 44, and the fuel pressure), a provisional target value of the control output, and a current change rate of the control output, and calculate the target value by correcting the provisional target value of the control output based on the predicted maximum value so as to increase the degree of satisfaction of a constraint condition with regard to the control output.

In the embodiment, the prediction model is derived, assuming that a secondary delay occurs in the response of the control output. However, depending on the type of the control output, or the like, the prediction model may be derived assuming that a primary delay or a third delay occurs. This makes it possible to calculate a predicted maximum overshoot value of the control output from a target value with more accuracy. Therefore, the prediction model may be derived, assuming that the primary delay, or a multidimensional delay that is a third delay or a delay of a higher-order.

What is claimed is:

1. A control system comprising an electronic control unit including a feedback controller and a reference governor,
the feedback controller being configured to determine a value of a control input such that a value of a control output approximates a target value,
the reference governor being configured to calculate, with a prediction model, a predicted maximum value of an overshoot amount of the control output that overshoots the target value, based on a current value of the control output, a provisional target value of the control output, and a current change rate of the control output, the prediction model being derived assuming that a n-th delay occurs in a response of the control output, where n is a natural number, the current change rate of the control output being calculated based on the current value of the control output and a past value of the control output, and
the reference governor being configured to calculate the target value by correcting the provisional target value of the control output based on the predicted maximum value so as to increase a degree of satisfaction of a constraint condition with regard to the control output.

2. The control system according to claim 1, wherein the prediction model is derived assuming that a secondary delay occurs in the response of the control output.

3. The control system according to claim 2, wherein
the reference governor is configured to calculate the predicted maximum value by using, as the prediction model, expressions (1), (2) as follows:

$$OS_{max} = \mu(r(t) - x(t)) \quad (1)$$

$$\mu = \frac{e^{-\zeta \omega_n t_{os}}}{\sqrt{D^2 + E^2}}(E + CD) \quad (2)$$

where $OS_{max}$ represents the predicted maximum value, r(t) represents the provisional target value of the control output, and x(t) represents the current value of the control output in expression (1), $\zeta$ represents a damping coefficient, $\omega_n$ represents a natural angular frequency, and $t_{os}$ represents maximum time when the overshoot amount is predicted to be the maximum in expression (2), and C, D, E are defined by expressions (3), (4), (5) as follows:

$$C = \frac{x'_0 - K\zeta\omega_n}{\omega_d} \quad (3)$$

$$D = x'_0 \quad (4)$$

$$E = \frac{K\omega_n - x'_0\zeta}{\sqrt{1-\zeta^2}} \quad (5)$$

$$\omega_d = \omega_n\sqrt{1-\zeta^2} \quad (6)$$

where K represents gain, and $x'_0$ represents the current change rate of the control output in expressions (3), (4), (5), and $\omega_d$ is defined by subsequent expression (6).

4. The control system according to claim 3, wherein the maximum time is calculated by expression (7) as follows:

$$t_{os} = \frac{\pi - \varphi}{\omega_d} \quad (7)$$

$$\varphi = \tan^{-1}\frac{x'_0\sqrt{1-\zeta^2}}{K\omega_n - x'_0\zeta} \quad (8)$$

where $t_{os}$ represents the maximum time in the expression (7) and $\varphi$ is defined by subsequent expression (8).

5. The control system according to claim 1, wherein
the reference governor is configured to calculate the target value by correcting the provisional target value of the control output such that a value of an objective function becomes smaller, the value of the objective function being determined in consideration of the degree of satisfaction of the constraint condition with regard to the control output, the value of the objective function being calculated such that as the predicted maximum value calculated by the reference governor becomes larger beyond an upper limit, the degree of satisfaction of the constraint condition becomes lower and the value of the objective function becomes larger.

6. The control system according to claim 1, wherein a value of at least one parameter used in the prediction model is changed depending on a control gain in the feedback controller.

7. The control system according to claim 1, further comprising an internal combustion engine including a supercharger, wherein
the electronic control unit controls the internal combustion engine, and the control output includes supercharging pressure.

8. The control system according to claim 1, further comprising an internal combustion engine including an exhaust gas recirculation system that supplies some of exhaust gas to an intake passage, wherein
the electronic control unit controls the internal combustion engine, and the control output includes an exhaust gas recirculation rate.

9. The control system according to claim 1, further comprising an internal combustion engine including a particulate filter that catches fine particles in exhaust gas, wherein
the electronic control unit controls the internal combustion engine, and the control output includes temperature of the particulate filter.

10. The control system according to claim 1, further comprising an internal combustion engine including a fuel-pressure control device that controls pressure of fuel supplied to a fuel injection valve that injects the fuel into a combustion chamber, wherein
the electronic control unit controls the internal combustion engine, and the control output includes the pressure of the fuel.

* * * * *